United States Patent [19]
Baur et al.

[11] Patent Number: 5,259,089
[45] Date of Patent: Nov. 9, 1993

[54] HANDLE

[75] Inventors: Rudolph J. Baur, Cinnaminson; Albert V. Cawthon, Sewell, both of N.J.

[73] Assignee: PHC Industries, Inc., Camden, N.J.

[21] Appl. No.: 844,203

[22] Filed: Mar. 2, 1992

[51] Int. Cl.⁵ ........................ A47B 95/02; A47J 45/06
[52] U.S. Cl. ........................................ 16/125; 16/119
[58] Field of Search ................ 16/119, 114 R, 115, 16/125

[56] References Cited

U.S. PATENT DOCUMENTS

| | | | |
|---|---|---|---|
| 3,183,549 | 5/1965 | Hammesfahr | 16/125 |
| 3,707,016 | 12/1972 | Smoot | 16/125 |
| 4,357,734 | 11/1982 | Moore | 16/125 |

FOREIGN PATENT DOCUMENTS

| | | | |
|---|---|---|---|
| 1172967 | 6/1964 | Fed. Rep. of Germany | 16/125 |
| 1176012 | 8/1964 | Fed. Rep. of Germany | 16/125 |
| 1779991 | 4/1973 | Fed. Rep. of Germany | 16/125 |
| 2435544 | 2/1976 | Fed. Rep. of Germany | 16/125 |
| 3607744 | 9/1987 | Fed. Rep. of Germany | 16/125 |
| 1484990 | 5/1967 | France | 16/125 |
| 182200 | 1/1963 | Sweden | 16/125 |
| 875689 | 8/1961 | United Kingdom | 16/125 |

Primary Examiner—John Sipos
Assistant Examiner—Carmine Cuda
Attorney, Agent, or Firm—Z. T. Wobensmith, III

[57] ABSTRACT

A handle which includes a ribbon like metal strip, which has a center portion and at each end has a flat end plate. A covering is provided around the strip, which has integral end blocks to engage the strip end plates. The end plates have openings with grommets therein which extend above the end plates. A retainer pin extends through each end plate and into contact with a part of the vehicle or item, the pins nesting in recesses in the end blocks of the covering.

3 Claims, 2 Drawing Sheets

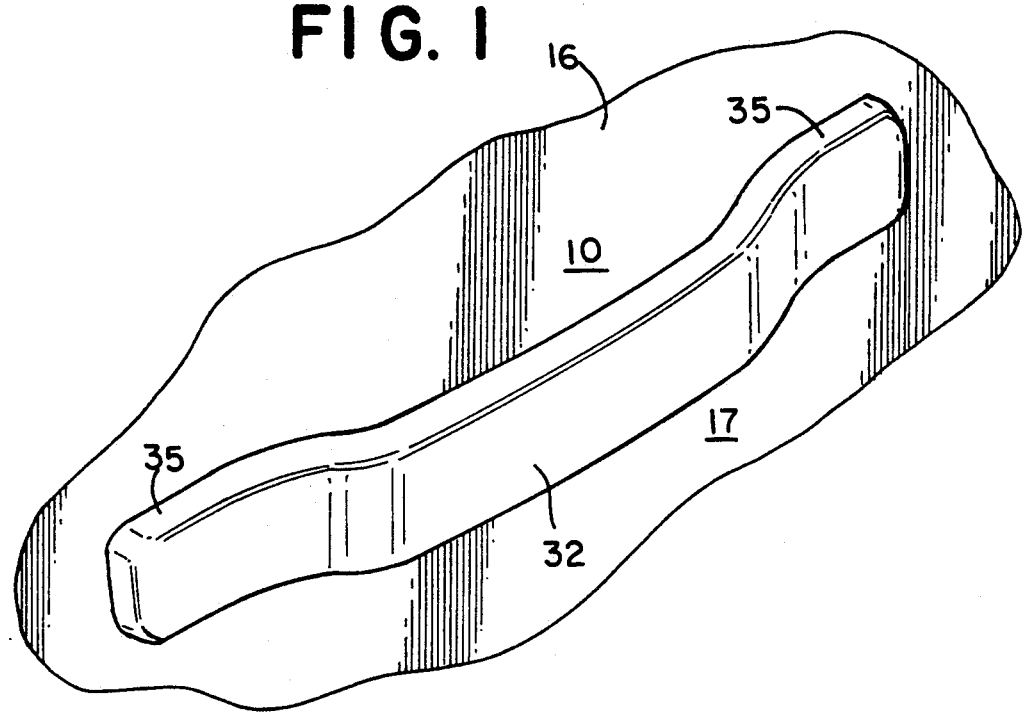
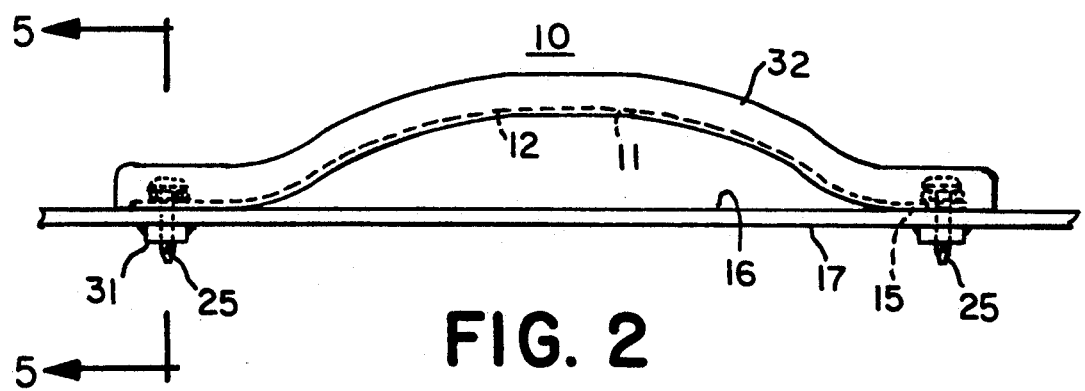

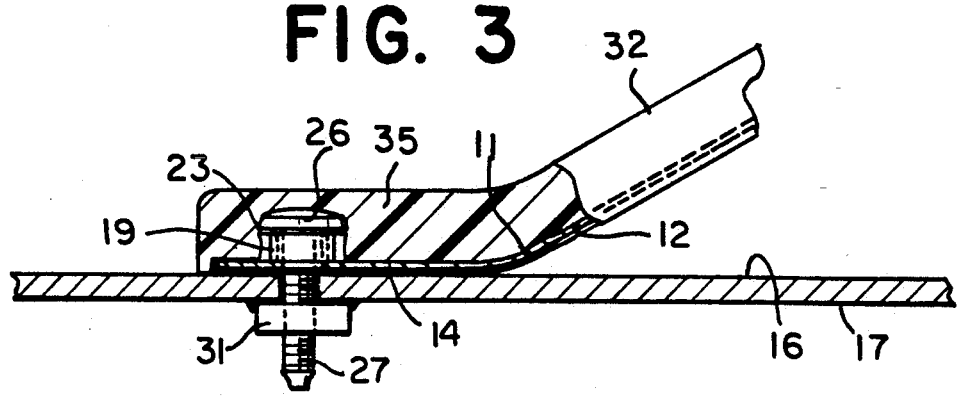
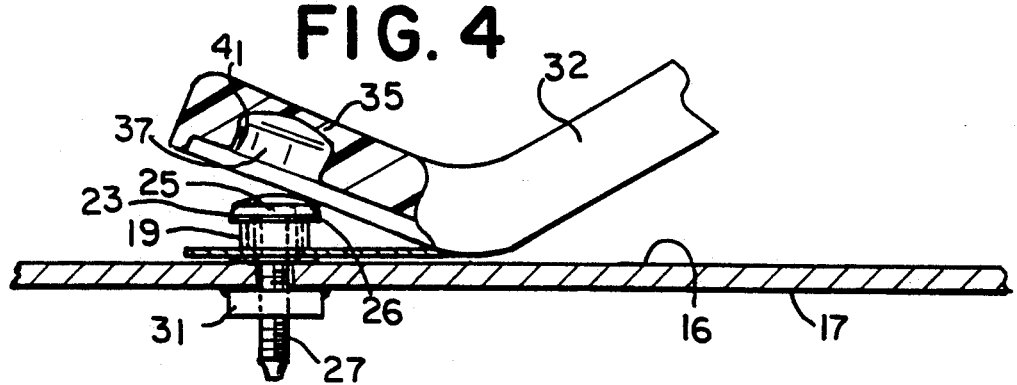
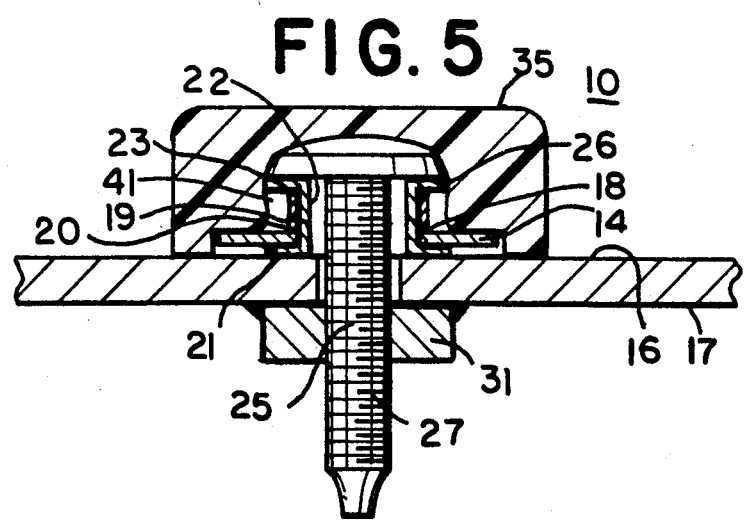

HANDLE

BACKGROUND OF THE INVENTION

1. Field of the Invention

This invention relates to a handle of the pull strap type which includes a metal strip with a molded plastic covering theraround, and fasteners through each end for fastening the handle to a portion of a vehicle or other structure, with recesses in the covering at each end detachably engaged with the fasteners.

2. Description of the Prior Art

Handles are used with many items such as luggage, bags, and in automotive vehicles such as buses, trucks, vans and cars. Automotive vehicles require a wide variety and number of handles for use on doors, headliners, the backs of seats and other locations to assist passengers in opening and closing doors, and for support when riding, entering or disembarking from vehicles.

The handles must be relatively inexpensive, of attractive appearance, sturdy and capable of withstanding a lot of abuse, and designed for easy assembly during the mass production of vehicles, but easily removable if desired.

The prior art handles in common use with automotive vehicles or other structures are of many varieties, but the most common type includes a central strap portion which is of plastic reinforced with a steel strip. The ends of the strap are usually captured in housing of molded chromed plastic, with a removable snap-in or adhesively retained cover, which conceals a retainer pin, that attaches the housing to a portion of an automotive vehicle. The prior art covers are difficult to remove without damaging them, and are time consuming to install and to remove. Other versions are used which do not have an outer housing, but have recesses in the handle which are fitted with removable plugs to provide access for insertion and removal of retainer pins into the recess and engagement with a portion of the vehicle. The plug approach is less than satisfactory as the plugs often fall out, become lost, and present an unsightly appearance, or they become wedged in so tightly that removal causes disfigurement of the handle.

It is desirable to provide handles that can be easily and inexpensively manufactured on conventional equipment, and which provide a superior grip as well as a finished appearance.

The handle of the invention provides a durable product, which is easy to assemble and disassemble to a vehicle or other structure, does not require any separate parts, and does not suffer from the disadvantages of the prior art devices.

SUMMARY OF THE INVENTION

The handle of the invention includes a flat steel reinforcing strip, surrounded by a covering of molded plastic which strip has flat ends with openings therethrough having grommets thereon, and with fasteners to extend through the openings to engage a portion of the vehicle or other structure, the covering including end portions having recesses which snap onto and off of the fasteners, and conceal the strip ends.

The principal object of the invention is to provide a handle which is of reinforced molded construction, and does not have any separate parts.

A further object of the invention is to provide a handle of the character aforesaid which can be easily and economically mass produced on conventional equipment.

A further object of the invention is to provide a handle of the character aforesaid which can be used in a variety of applications, and is easily assembled and disassembled therefrom.

A further object of the invention is to provide a handle of the character aforesaid which is durable and long lasting in service.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof in which:

FIG. 1 is a view in perspective of a preferred embodiment of a handle constructed in accordance with the invention, and in assembled condition, FIG. 2 is a side elevational view in partial phantom of the handle of FIG. 1;

FIG. 3 is a fragmentary sectional view, enlarged, of an end portion of the handle of FIG. 1 in assembled condition;

FIG. 4 is a view similar to FIG. 3 showing an end portion of the handle in partially disassembled condition, and FIG. 5 is a vertical sectional view enlarged, taken approximately on the Line 5—5 of FIG. 2.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENT

Referring now more particularly to the drawings and FIGS. 1-5 inclusive the handle 10 of the invention is therein illustrated, and which includes a strip 11 with a central portion 12 and end plates 14 and 15 integral therewith and extending therefrom. The strip 11 is preferably formed of steel, of generally flat ribbon like configuration to provide strength and durability to the handle 10. The end plates 14 and 15 are at an angle to the central portion 12, and are intended to be engaged with the surface 16 of a panel 17 of a vehicle (not shown) or other structure to which the handle 10 is to be attached. The end plate 14 has an opening 18 therethrough, which has a grommet 19 engaged with the opening 18, and with collar 20 around the grommet 19. The grommet 19 is of well-known U-shape type with a lower ring 21, vertical plate 22 and top ring 23.

A fastener 25 is provided, which extends through the grommet 19, and with a rounded head 26 which rests on the ring 23. The end plate 15 has a like grommet 19 with a fastener 25 engaged therein. The lower rings 21 space the end plates 14 and 15 from the panel 17. The fasteners 25 as illustrated are pins which have threaded shafts 27 which extend through the grommets 19.

The pins 25 are also engaged in the panel 17 of the vehicle (not shown), and retained thereto by engagement of the threaded shafts 27 with captive fasteners 31 of well known type attached to panel 17.

The strip 11 has a cover 32 engaged therewith, which surrounds the central portion 12 to provide for gripping by the user. The cover 32 is preferably formed of a resilient moldable plastic material of well known type, and which can be vinyl plastic.

The cover 32 is of the same general configuration as the strip 11, and has integral end blocks 35 which extend substantially over the end plates 14 and 15. The end block 35, which is shown in more detail in FIGS. 3, 4, and 5 is of rectangular configuration, with a recess 37, which accomodates the end plate 14, as shown in FIG. 3, and engages the head 26 of pin 25. The recess 37 conforms to the outer configuration of the pin 25, and ring 23 and is also provided with a wall 41 of reduced diameter which extends under the ring 23 and head 26 of pin 25.

The recess 37 is formed during the manufacturing process which is preferably injection molding of the plastic, and is accomplished with the strip 11 in a die (not shown).

The recess 37 and its wall 41 permit the end blocks 35 to be lifted off plates 14 and 15, the pins 25 inserted and the blocks 35 pressed down covering the end plates 14, and 15 and pins 25, thereby retaining the ends 35 thereon but which can be snapped off and pins 25, and the handle 10 removed and replaced as required.

It will thus be seen that structure has been described with which the objects of the invention are achieved.

We claim:

1. A handle for attachment to a panel or other surface which comprises
   a ribbon-like metallic strip,
   said strip having a center portion and end plates extending therefrom at an angle thereto,
   said end plates being in a parallel plane to said panel,
   said end plates having openings therethrough,
   grommets engaged with said openings,
   spacing means on said grommets to space said end plates above said panel,
   fasteners in said grommets to attach and retain said end plates to said panel or surface,
   a continuous resilient covering extending around said center portion and substantially around said end plates,
   said end plates covering is end blocks means which have recesses for engagement with said grommets, said fasteners and said end plates, said grommets and fasteners defining an annular space below a head of said fasteners which receive a portion of the recesses wall
   whereby said end block means protects said fasteners during use but provides access for their insertion and/or removal by detachment of said end block means.

2. A handle as defined in claim 1 in which said covering is of resilient moldable plastic.

3. A handle as described in claim 1 in which said fasteners are round headed pins in said grommets.

* * * * *